United States Patent
Ishida et al.

(10) Patent No.: US 9,831,516 B2
(45) Date of Patent: Nov. 28, 2017

(54) FUEL CELL

(71) Applicant: HONDA MOTOR CO., LTD., Tokyo (JP)

(72) Inventors: Kentaro Ishida, Wako (JP); Kenji Nagumo, Wako (JP); Yoshihito Kimura, Wako (JP); Yu Tomana, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 14/601,230

(22) Filed: Jan. 21, 2015

(65) Prior Publication Data

US 2015/0207164 A1    Jul. 23, 2015

(30) Foreign Application Priority Data

Jan. 22, 2014   (JP) .................................. 2014-009429

(51) Int. Cl.

| | |
|---|---|
| *H01M 8/10* | (2016.01) |
| *H01M 8/04* | (2016.01) |
| *H01M 8/02* | (2016.01) |
| *H01M 8/1004* | (2016.01) |
| *H01M 8/0273* | (2016.01) |

(Continued)

(52) U.S. Cl.

CPC ....... *H01M 8/1004* (2013.01); *H01M 8/0258* (2013.01); *H01M 8/0273* (2013.01); *H01M 8/2483* (2016.02); *H01M 2008/1095* (2013.01); *H01M 2250/20* (2013.01); *Y02E 60/521* (2013.01); *Y02T 90/32* (2013.01)

(58) Field of Classification Search

CPC ............ H01M 8/10; H01M 8/04; H01M 8/02; H01M 8/1004; H01M 8/0273; H01M 8/04201; H01M 8/1018; H01M 2008/1095; H01M 2300/0082; H01M 2250/20

See application file for complete search history.

(56) References Cited

U.S. PATENT DOCUMENTS

| | | | | |
|---|---|---|---|---|
| 2008/0292941 | A1* | 11/2008 | Oda ...................... | H01M 8/026 429/434 |
| 2011/0008690 | A1* | 1/2011 | Kagami .............. | H01M 8/0258 429/414 |
| 2013/0316261 | A1* | 11/2013 | Ishida ............... | H01M 8/04007 429/434 |

FOREIGN PATENT DOCUMENTS

| | | |
|---|---|---|
| JP | 5197995 B2 | 12/2008 |
| JP | 2013-020945 | 1/2013 |

(Continued)

*Primary Examiner* — Sarah A Slifka
(74) *Attorney, Agent, or Firm* — Mori & Ward, LLP

(57) ABSTRACT

A fuel cell includes a membrane electrode assembly, a separator, a reactant gas channel, a reactant gas manifold, and a buffer portion. The buffer portion includes a first buffer region and a second buffer region. The second buffer region is located in a vicinity of the reactant gas manifold and is deeper than the first buffer region in a stacking direction. Embossed portion groups are arranged in a plurality of rows in the second buffer region between the reactant gas manifold and the first buffer region. Each of the embossed portion groups includes a plurality of embossed portions. A disposition density of the plurality of embossed portions of one of the embossed portion groups in a vicinity of the reactant gas manifold is lower than a disposition density of the plurality of embossed portions of another of the embossed portion groups in a vicinity of the first buffer region.

8 Claims, 12 Drawing Sheets

(51) Int. Cl.
*H01M 8/0258* (2016.01)
*H01M 8/2483* (2016.01)
*H01M 8/1018* (2016.01)

(56) References Cited

FOREIGN PATENT DOCUMENTS

| | | |
|---|---|---|
| JP | 2013-125680 | 6/2013 |
| JP | 2013-145653 | 7/2013 |
| JP | 2013-201085 | 10/2013 |
| JP | 2013-201086 | 10/2013 |
| JP | 2013-246948 | 12/2013 |
| JP | 2013-258106 | 12/2013 |
| JP | 2013-258107 | 12/2013 |

* cited by examiner

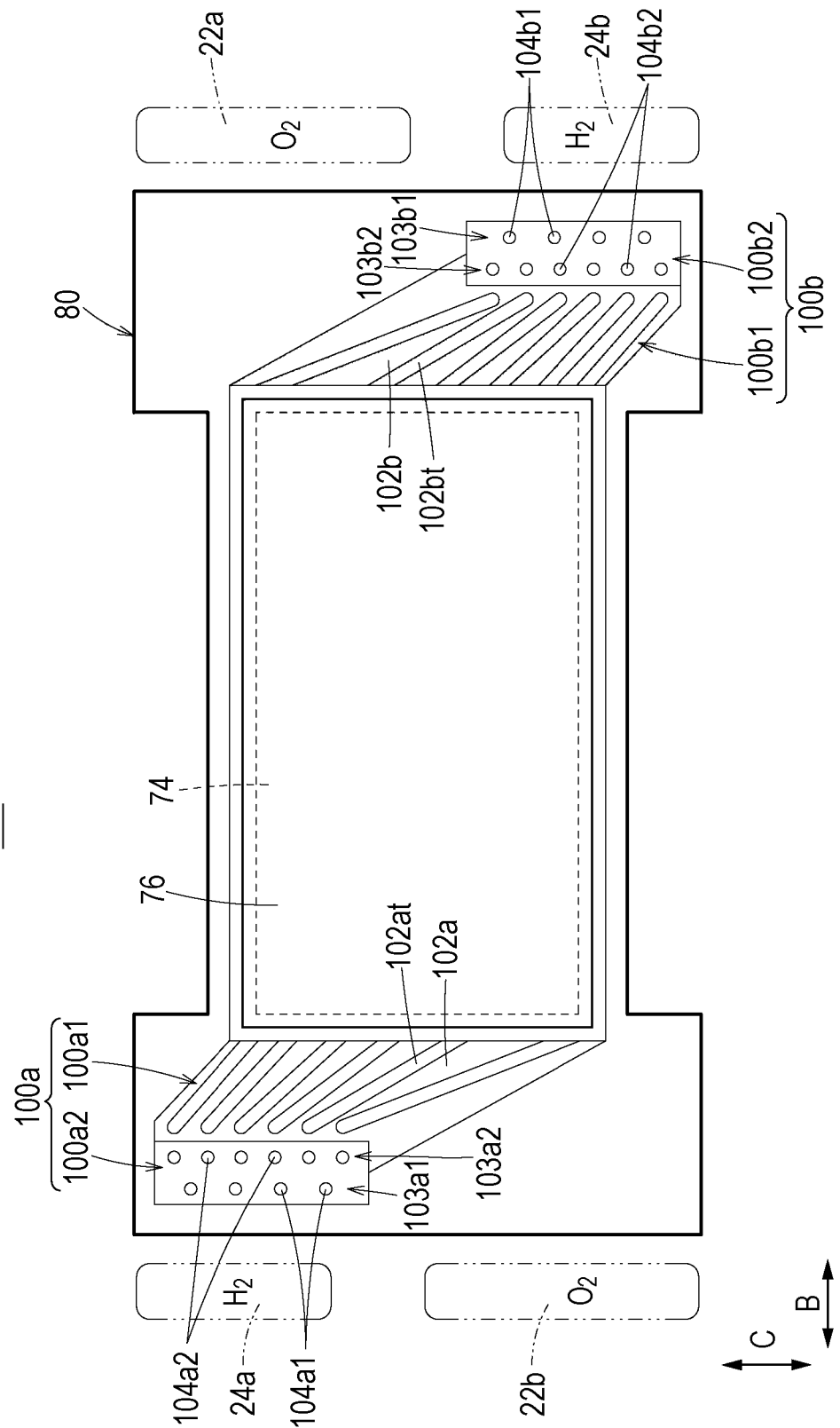

//  FUEL CELL

CROSS-REFERENCE TO RELATED APPLICATIONS

The present application claims priority under 35 U.S.C. §119 to Japanese Patent Application No. 2014-009429, filed Jan. 22, 2014, entitled "Fuel Cell." The contents of this application are incorporated herein by reference in their entirety.

BACKGROUND

1. Field

The present disclosure relates to a fuel cell.

2. Description of the Related Art

For example, a solid polymer electrolyte fuel cell includes a membrane electrode assembly (MEA), in which an anode electrode is disposed on one side of a solid-polymer electrolyte membrane and a cathode electrode is disposed on the other side of the solid-polymer electrolyte membrane. The solid-polymer electrolyte membrane is made from a polymer ion-exchange membrane. The MEA and a pair of separators, sandwiching the MEA therebetween, constitute a power generation cell (unit cell). Several tens to several hundreds of such power generation cells are stacked and used, for example, as a vehicle fuel cell stack.

In a typical case, a fuel cell has a so-called internal manifold structure for supplying a fuel gas and an oxidant gas, each of which is a reactant gas, respectively to anode electrodes and cathode electrodes of power generation cells that are stacked. The internal manifold structure includes a reactant gas inlet manifold and a reactant gas outlet manifold, each extending through the power generation cells in a stacking direction in which the power generation cells are stacked. The reactant gas inlet manifold and the reactant gas outlet manifold (which, hereinafter, may be collectively referred to as a reactant gas manifold) are respectively connected to an inlet and an outlet of a reactant gas channel, through which the reactant gas is supplied along an electrode surface.

In this case, the reactant gas manifold has a comparatively small opening area. Accordingly, in order to allow the reactant gas to smoothly flow through a reactant gas channel, it is necessary to provide buffer portions (an inlet buffer portion and an outlet buffer portion), for diffusing the reactant gas, in the vicinity of the reactant gas manifold.

For example, Japanese Patent No. 5197995 describes a fuel cell in which a reactant gas can be uniformly supplied to the entirety of a reactant gas channel from a reactant gas manifold through a buffer portion.

In this fuel cell, a separator has the reactant gas manifold, through which the reactant gas flows in a stacking direction, and the buffer portion, which connects the reactant gas manifold to the reactant gas channel. The buffer portion includes a first buffer region near the reactant gas manifold and a second buffer region near the reactant gas channel. The first buffer region (deep buffer) is deeper than the second buffer region (shallow buffer) in the stacking direction. Accordingly, it is possible to uniformly and reliably supply the reactant gas to the entirety of the reactant gas channel from the reactant gas manifold through the buffer portion.

SUMMARY

According to one aspect of the present invention, a fuel cell includes a membrane electrode assembly, a separator, a reactant gas channel, a reactant gas manifold, and a buffer portion. The membrane electrode assembly and the separator are stacked. The membrane electrode assembly includes an electrolyte membrane and a pair of electrodes sandwiching the electrolyte membrane therebetween. A reactant gas is supplied through the reactant gas channel along an electrode surface of the membrane electrode assembly. The reactant gas flows through the reactant gas manifold in a stacking direction in which the separator is stacked. The buffer portion connects the reactant gas manifold to the reactant gas channel. The buffer portion includes a first buffer region and a second buffer region. The first buffer region is located near the reactant gas channel and includes a plurality of guide channels. The second buffer region is located near the reactant gas manifold and is deeper than the first buffer region in the stacking direction. Embossed portion groups are arranged in a plurality of rows in the second buffer region between the reactant gas manifold and the first buffer region. Each of the embossed portion groups includes a plurality of embossed portions. A disposition density of the embossed portions of one of the embossed portion groups near the reactant gas manifold is lower than a disposition density of the embossed portions of another of the embossed portion groups near the first buffer region.

According to another aspect of the present invention, a fuel cell includes a membrane electrode assembly, a separator, a reactant gas channel, a reactant gas manifold, and a buffer portion. The membrane electrode assembly and the separator are stacked in a stacking direction. The membrane electrode assembly includes an electrolyte membrane, a first electrode, and a second electrode. The first and the second electrodes sandwich the electrolyte membrane between the first and the second electrodes in the stacking direction. A reactant gas is supplied through the reactant gas channel along an electrode surface of the membrane electrode assembly. The reactant gas flows through the reactant gas manifold in the stacking direction. The buffer portion connects the reactant gas manifold to the reactant gas channel. The buffer portion includes a first buffer region and a second buffer region. The first buffer region is located in a vicinity of the reactant gas channel and includes a plurality of guide channels. The second buffer region is located in a vicinity of the reactant gas manifold and is deeper than the first buffer region in the stacking direction. Embossed portion groups are arranged in a plurality of rows in the second buffer region between the reactant gas manifold and the first buffer region. Each of the embossed portion groups includes a plurality of embossed portions. A disposition density of the plurality of embossed portions of one of the embossed portion groups in a vicinity of the reactant gas manifold is lower than a disposition density of the plurality of embossed portions of another of the embossed portion groups in a vicinity of the first buffer region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 12 illustrates the other surface of the second membrane electrode assembly of the power generation unit.

DESCRIPTION OF THE EMBODIMENTS

Figure 1:
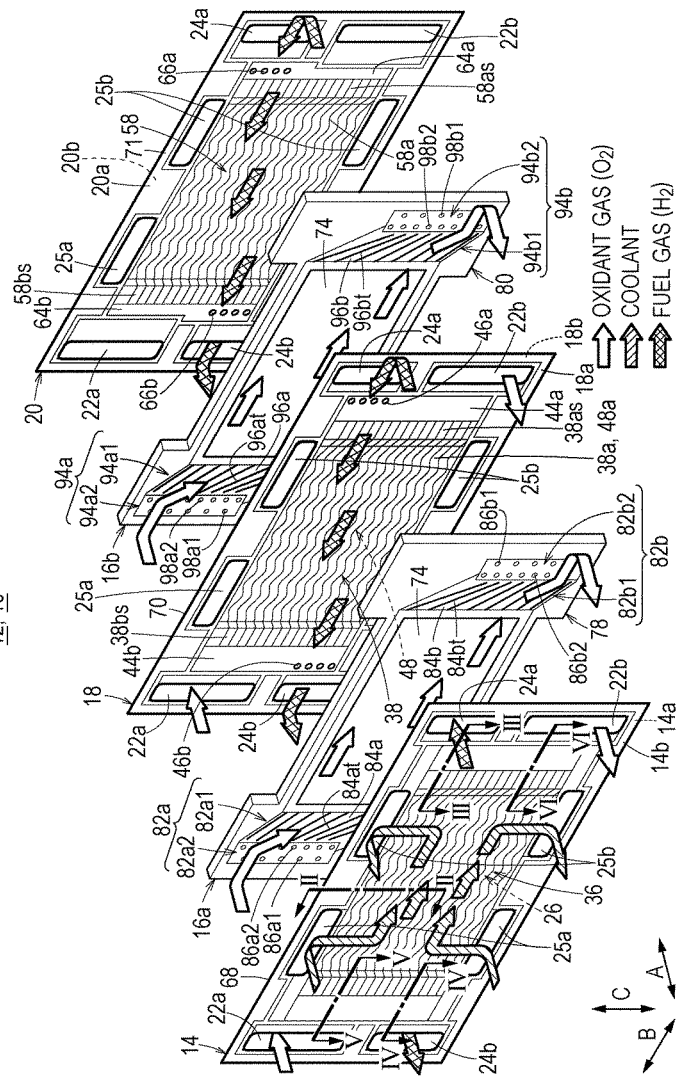
FIG. 1 is an exploded partial perspective view of a power generation unit of a fuel cell according to an embodiment of the present disclosure.

The embodiments will now be described with reference to the accompanying drawings, wherein like reference numerals designate corresponding or identical elements throughout the various drawings.

Referring to FIGS. 1 to 6, a fuel cell 10 according to an embodiment of the present disclosure includes a plurality of power generation units 12. The power generation units 12 are stacked in a horizontal direction (direction of arrow A) or in a vertical direction (direction of arrow C). For example, the fuel cell 10 may be used as a fuel cell stack mounted in a fuel cell electric vehicle (not shown).

Each of the power generation units 12 includes a first separator 14, a first membrane electrode assembly 16a (MEA), a second separator 18, a second membrane electrode assembly 16b (MEA), and a third separator 20.

Each of the first separator 14, the second separator 18, and the third separator 20 is a rectangular metal plate that is, for example, a steel plate, a stainless steel plate, an aluminum plate, a galvanized steel plate, or any of these metal plates having an anticorrosive coating on the surface thereof. Each of the first separator 14, the second separator 18, and the third separator 20, which has a rectangular shape in plan view, is made by press-forming a thin metal plate so as to have a corrugated cross section. For example, the first separator 14, the second separator 18, and the third separator 20 may be carbon separators, instead of being metal separators.

As illustrated in FIG. 1, an oxidant gas inlet manifold 22a and a fuel gas outlet manifold 24b are formed in the power generation unit 12 so as to extend in the direction of arrow A through one end portion (near one of short sides) of the power generation unit 12 in the longitudinal direction (the direction of arrow B). To be specific, the oxidant gas inlet manifold 22a and the fuel gas outlet manifold 24b are formed in one end portion of each of the first separator 14, the second separator 18, and the third separator 20 in the longitudinal direction. An oxidant gas, such as an oxygen-containing gas, is supplied through the oxidant gas inlet manifold 22a. A fuel gas, such as a hydrogen-containing gas, is discharged through the fuel gas outlet manifold 24b.

A fuel gas inlet manifold 24a and an oxidant gas outlet manifold 22b are formed in the power generation unit 12 so as to extend in the direction of arrow A through the other end portion of the power generation unit 12 in the longitudinal direction (the direction of arrow B). The fuel gas is supplied through the fuel gas inlet manifold 24a. The oxidant gas is discharged through the oxidant gas outlet manifold 22b.

A pair of coolant inlet manifolds 25a are formed in the power generation unit 12 so as to extend in the direction of arrow A through both end portions, near the oxidant gas inlet manifold 22a, of the power generation unit 12 in the transversal direction (direction of arrow C). A coolant is supplied through the pair of coolant inlet manifolds 25a. A pair of coolant outlet manifolds 25b is formed in the power generation unit 12 so as to extend through both end portions, near the fuel gas inlet manifold 24a, of the power generation unit 12 in the transversal direction. The coolant is discharged through the pair of coolant outlet manifolds 25b.

Figure 7:
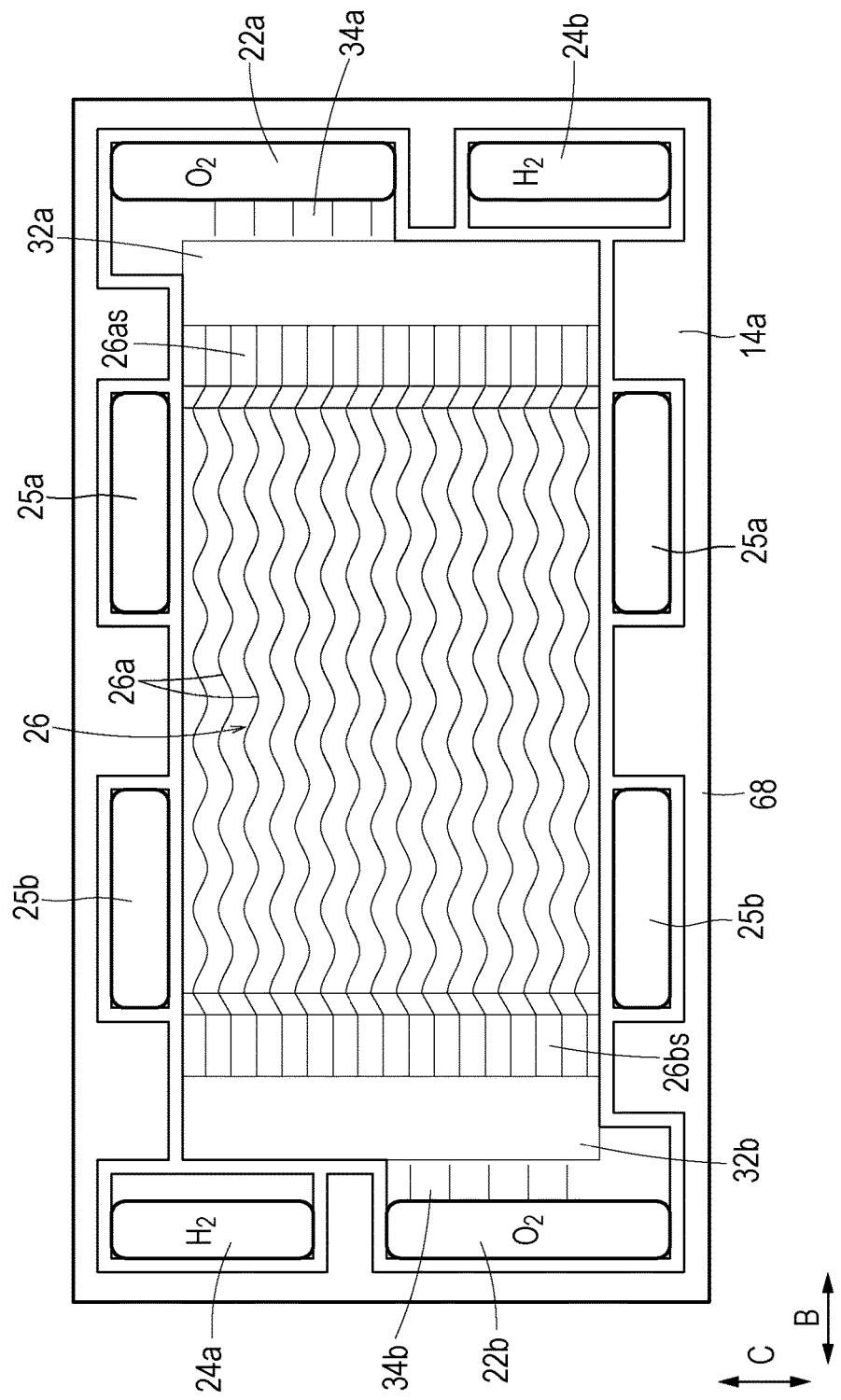
FIG. 7 is a plan view of a first separator of the power generation unit.

As illustrated in FIG. 7, a first oxidant gas channel 26, through which the oxidant gas inlet manifold 22a is connected to the oxidant gas outlet manifold 22b, is formed on a surface 14a of the first separator 14 facing the first membrane electrode assembly 16a.

The first oxidant gas channel 26 includes a plurality of wave-shaped channel grooves 26a (or linear channel grooves) that extend in the direction of arrow B. Linear channel grooves 26as and linear channel grooves 26bs are respectively formed at inlet end and outlet end of the first oxidant gas channel 26.

An inlet flat portion 32a and an outlet flat portion 32b are respectively disposed outward from the linear channel grooves 26as and the linear channel grooves 26bs. A plurality of inlet connection grooves 34a are formed between the inlet flat portion 32a and the oxidant gas inlet manifold 22a. A plurality of outlet connection grooves 34b are formed between the outlet flat portion 32b and the oxidant gas outlet manifold 22b.

As illustrated in FIG. 1, a part of a coolant channel 36, through which the pair of coolant inlet manifolds 25a is connected to the pair of coolant outlet manifolds 25b, is formed on a surface 14b of the first separator 14. The coolant channel 36 is formed between the back side of the first oxidant gas channel 26 formed on the first separator 14 and the back side of a second fuel gas channel 58 formed on the third separator 20.

A first fuel gas channel 38, through which the fuel gas inlet manifold 24a is connected to the fuel gas outlet manifold 24b, is formed on a surface 18a of the second separator 18 facing the first membrane electrode assembly 16a. The first fuel gas channel 38 includes a plurality of wave-shaped channel grooves 38a (or linear channel grooves) that extend in the direction of arrow B.

Linear channel grooves 38as and linear channel grooves 38bs are respectively formed at one end of the first fuel gas channel 38 near the fuel gas inlet manifold 24a and at the other end of the first fuel gas channel 38 near the fuel gas outlet manifold 24b. An inlet flat portion 44a and an outlet flat portion 44b are respectively disposed outward from the linear channel grooves 38as and the linear channel grooves 38bs. In the inlet flat portion 44a, a plurality of supply holes 46a are formed in the vicinity of the fuel gas inlet manifold 24a. In the outlet flat portion 44b, a plurality of discharge holes 46b are formed in the vicinity of the fuel gas outlet manifold 24b.

Figure 8:
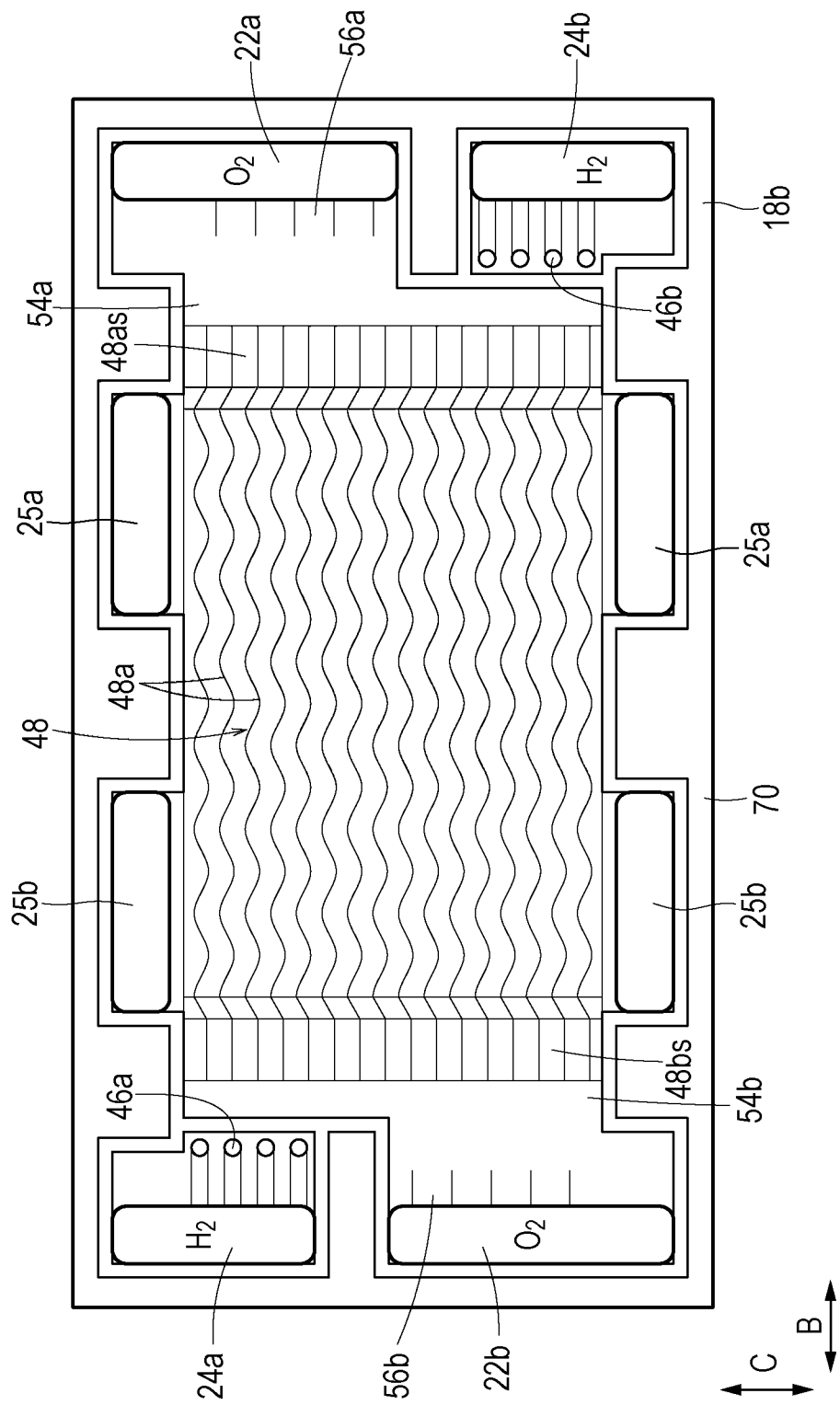
FIG. 8 is a plan view of a second separator of the power generation unit.

As illustrated in FIGS. 1 and 8, a second oxidant gas channel 48, through which the oxidant gas inlet manifold 22a is connected to the oxidant gas outlet manifold 22b, is formed on a surface 18b of the second separator 18 facing the second membrane electrode assembly 16b. The second oxidant gas channel 48 includes a plurality of wave-shaped channel grooves 48a (or linear channel grooves) that extend in the direction of arrow B.

Linear channel grooves 48as and linear channel grooves 48bs are respectively formed at inlet end and outlet end of the second oxidant gas channel 48. An inlet flat portion 54a and an outlet flat portion 54b are respectively disposed outward from the linear channel grooves 48as and the linear channel grooves 48bs. A plurality of inlet connection grooves 56a are formed between the inlet flat portion 54a and the oxidant gas inlet manifold 22a. A plurality of outlet connection grooves 56b are formed between the outlet flat portion 54b and the oxidant gas outlet manifold 22b.

As illustrated in FIG. 1, the second fuel gas channel 58, through which the fuel gas inlet manifold 24a is connected to the fuel gas outlet manifold 24b, is formed on a surface 20a of the third separator 20 facing the second membrane electrode assembly 16b. The second fuel gas channel 58 includes a plurality of wave-shaped channel grooves 58a (or linear channel grooves) that extend in the direction of arrow B. Linear channel grooves 58as and linear channel grooves 58bs are respectively formed at inlet end and outlet end of the second fuel gas channel 58.

An inlet flat portion 64a and an outlet flat portion 64b are respectively disposed outward from the linear channel grooves 58as and the linear channel grooves 58bs. In the inlet flat portion 64a, a plurality of supply holes 66a are formed in the vicinity of the fuel gas inlet manifold 24a. In the outlet flat portion 64b, a plurality of discharge holes 66b are formed in the vicinity of the fuel gas outlet manifold 24b.

A first sealing member 68 is integrally formed on the surfaces 14a and 14b of the first separator 14 so as to surround the outer peripheral end portion of the first separator 14. A second sealing member 70 is integrally formed on the surfaces 18a and 18b of the second separator 18 so as to surround the outer peripheral end portion of the second separator 18. A third sealing member 71 is integrally formed on the surfaces 20a and a surface 20b of the third separator 20 so as to surround the outer peripheral end portion of the third separator 20. Each of the first sealing member 68, the second sealing member 70, and the third sealing member 71 includes a flat sealing portion and a protruding sealing portion, which are integrated with each other. The flat sealing portion extends along a separator surface with a uniform thickness. The protruding sealing portion hermetically or liquid-tightly seals a space in which an oxidant gas, a fuel gas, or a coolant is contained.

The first, second, and third sealing members 68, 70, and 71 are each made of an elastic material, such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

Figure 2:
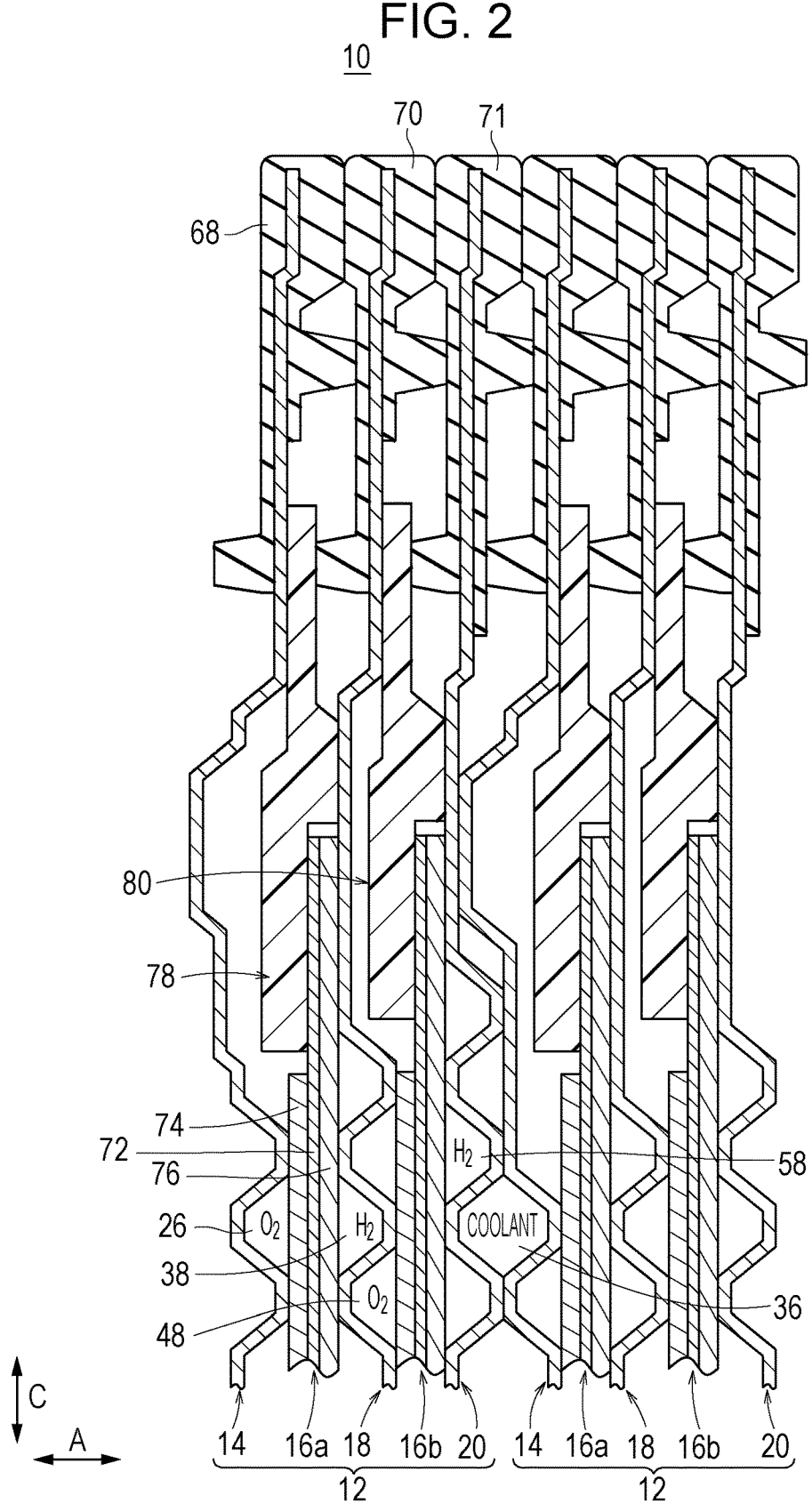
FIG. 2 is a sectional view of the power generation unit taken along line II-II in FIG. 1.

As illustrated in FIG. 2, each of the first membrane electrode assembly 16a and the second membrane electrode assembly 16b includes a solid polymer electrolyte membrane 72 (cation-exchange membrane). The solid polymer electrolyte membrane 72 is, for example, a thin film that is made of perfluorosulfonic acid copolymers and soaked with water. The solid polymer electrolyte membrane 72 is sandwiched between a cathode electrode 74 and an anode electrode 76. Each of the first and second membrane electrode assemblies 16a and 16b is a so-called stepped MEA, in which the cathode electrode 74 has a size in plan view smaller than that of each of the anode electrode 76 and the solid polymer electrolyte membrane 72.

Alternatively, the cathode electrode 74, the anode electrode 76, and the solid polymer electrolyte membrane 72 may have the same size in plan view. Further alternatively, the anode electrode 76 may have a size in plan view that is smaller than that of each of the cathode electrode 74 and the solid polymer electrolyte membrane 72.

The cathode electrode 74 and the anode electrode 76 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 72.

Referring to FIGS. 1 to 6, in the first membrane electrode assembly 16a, a first resin frame member 78 is disposed on an outer peripheral portion of the solid polymer electrolyte membrane 72 so as to be located outward from an edge of the cathode electrode 74. The first resin frame member 78 is integrally formed, for example, by injection molding. Alternatively, a resin frame member that has been manufactured beforehand may be joined to the outer peripheral portion.

In the second membrane electrode assembly 16b, a second resin frame member 80 (resin frame member) is disposed on an outer peripheral portion of the solid polymer electrolyte membrane 72 so as to be located outward from an edge of the cathode electrode 74. The second resin frame member 80 is integrally formed, for example, by injection molding. Alternatively, a resin frame member that has been manufactured beforehand may be joined to the outer peripheral portion.

A commodity plastic, an engineering plastic, a super engineering plastic, or the like may be used as the material of the first resin frame member 78 and the second resin frame member 80.

Figure 9:
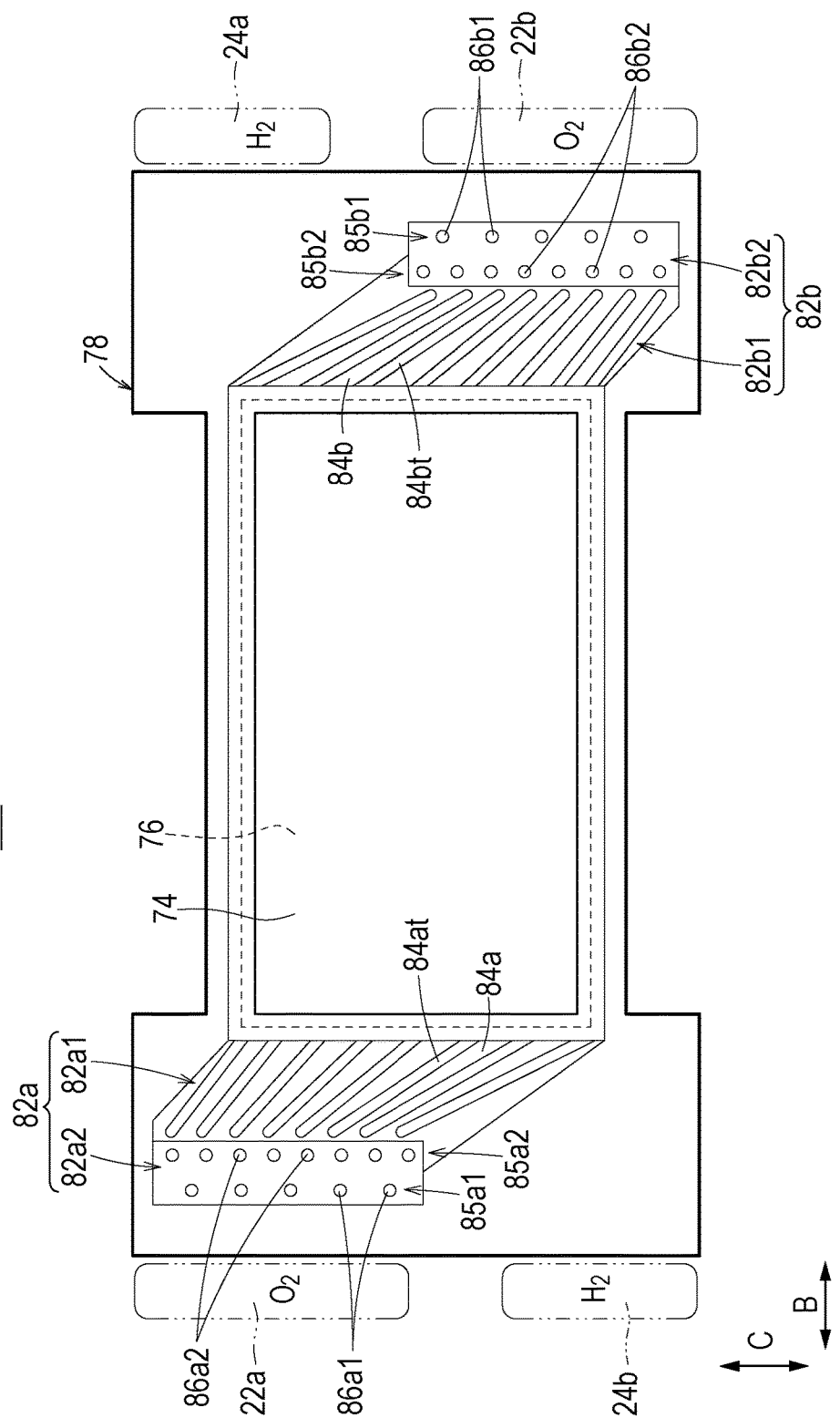
FIG. 9 illustrates one surface of a first membrane electrode assembly of the power generation unit.

As illustrated in FIGS. 1 and 9, on a surface of the first resin frame member 78 on the cathode electrode 74 side, an inlet buffer portion 82a is disposed between the oxidant gas inlet manifold 22a and an inlet of the first oxidant gas channel 26. An outlet buffer portion 82b is disposed between the oxidant gas outlet manifold 22b and an outlet of the first oxidant gas channel 26.

Figure 5:
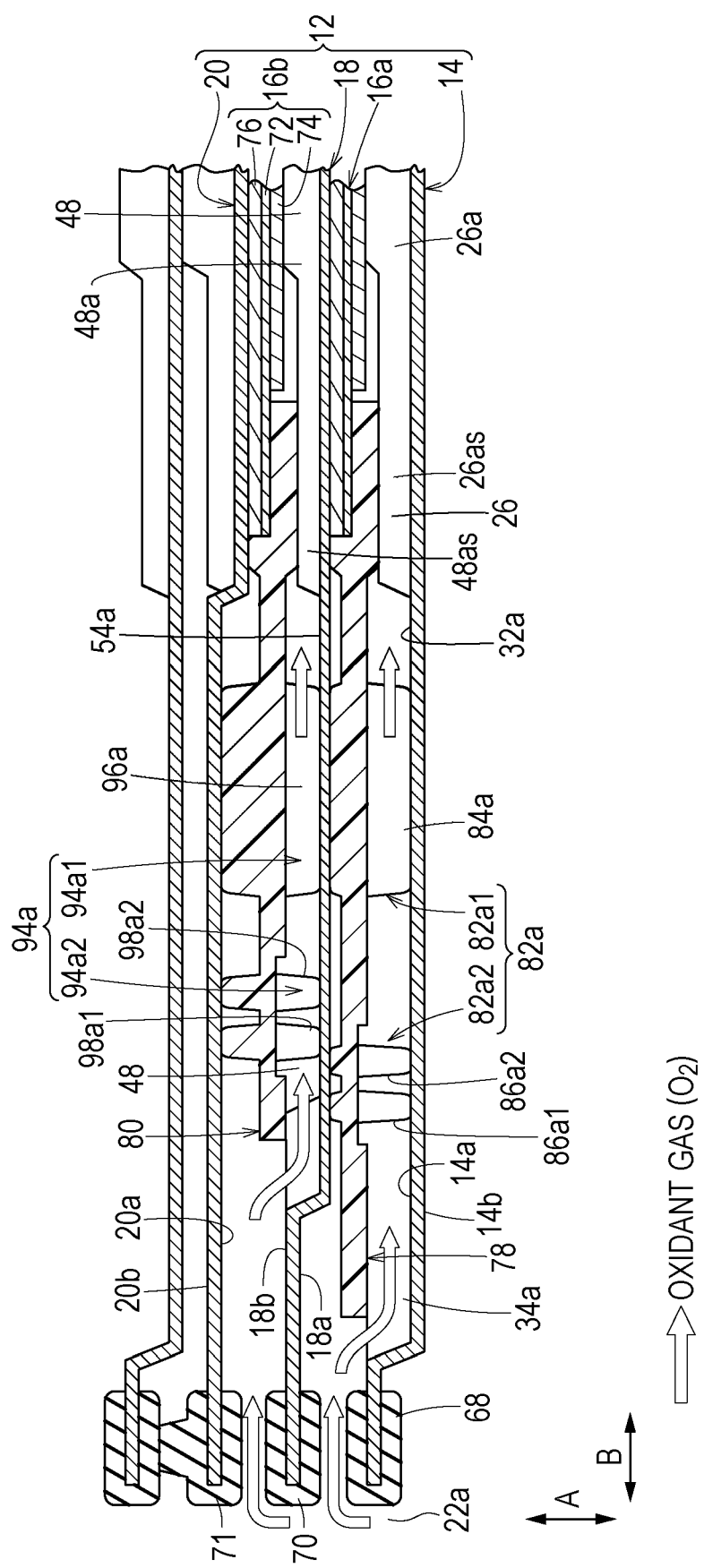
FIG. 5 is a sectional view of the power generation unit taken along line V-V in FIG. 1.

As illustrated in FIG. 5, the inlet buffer portion 82a includes a first buffer region 82a1, which is located near the first oxidant gas channel 26, and a second buffer region 82a2, which is located near the oxidant gas inlet manifold 22a and is deeper than the first buffer region 82a1 in the stacking direction. As illustrated in FIG. 9, the first buffer region 82a1, which is a shallow buffer, includes a plurality of linear inlet guide channels 84a. The linear inlet guide channels 84a are formed between linear protrusions 84at.

The second buffer region 82a2, which is a deep buffer, includes a first embossed portion group 85a1 and a second embossed portion group 85a2 between the oxidant gas inlet manifold 22a and the first buffer region 82a1. The first and second embossed portion groups 85a1 and 85a2 extend in a plurality of rows, such as two (or three or more) rows, in the direction of arrow B. The first embossed portion group 85a1 includes a plurality of embossed portions 86a1 arranged in the direction of arrow C. The second embossed portion group 85a2 includes a plurality of embossed portions 86a2 arranged in the direction of arrow C. The disposition density of embossed portions of the first embossed portion group 85a1 is lower than the disposition density of embossed portions of the second embossed portion group 85a2.

Figure 6:
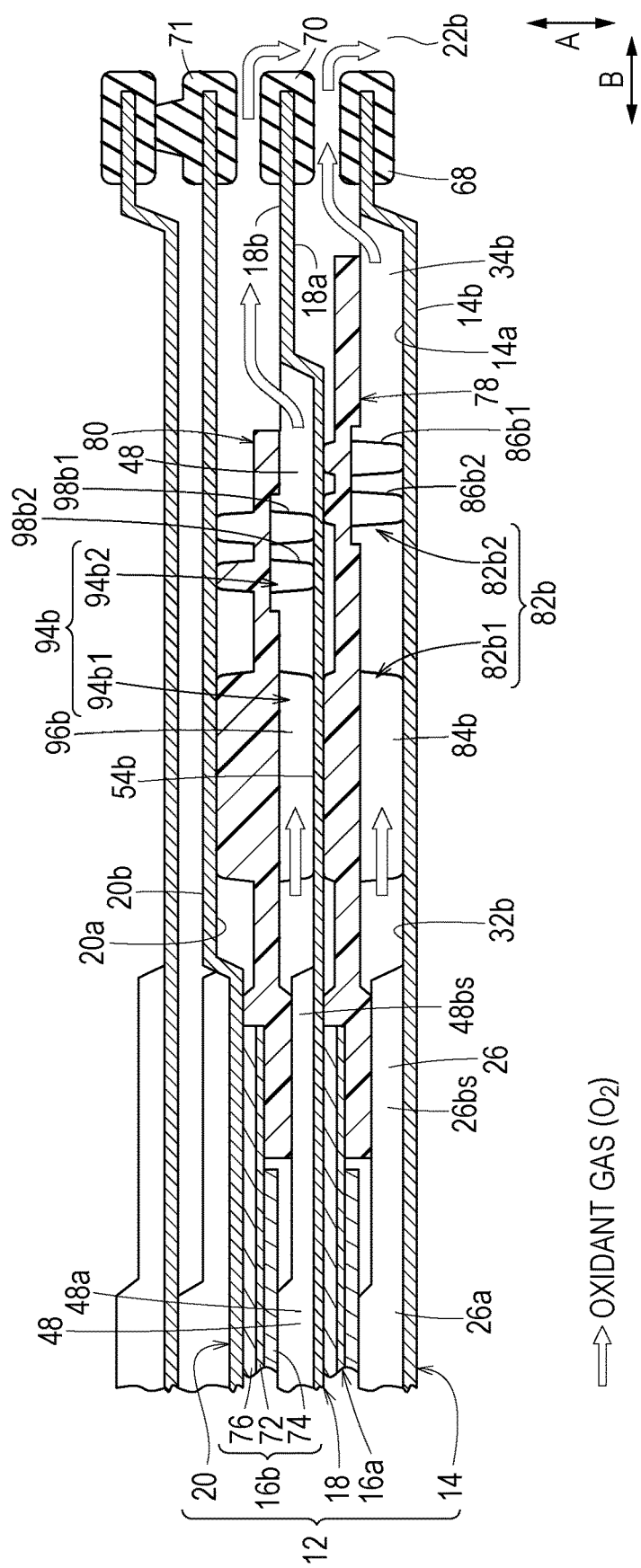
FIG. 6 is a sectional view of the power generation unit taken along line VI-VI in FIG. 1.

As illustrated in FIG. 6, the outlet buffer portion 82b includes a first buffer region 82b1, which is located near the first oxidant gas channel 26, and a second buffer region 82b2, which is located near the oxidant gas outlet manifold 22b and is deeper than the first buffer region 82b1 in the stacking direction. As illustrated in FIG. 9, the first buffer region 82b1, which is a shallow buffer, includes a plurality of linear outlet guide channels 84b. The linear outlet guide channels 84b are formed between linear protrusions 84bt.

The second buffer region 82b2, which is a deep buffer, includes a first embossed portion group 85b1 and a second embossed portion group 85b2 between the oxidant gas outlet manifold 22b and the first buffer region 82b1. The first and second embossed portion groups 85b1 and 85b2 extend in a plurality of rows, such as two rows, in the direction of arrow B. The first embossed portion group 85b1 includes a plurality of embossed portions 86b1 arranged in the direction of arrow C. The second embossed portion group 85b2 includes a plurality of embossed portions 86b2 arranged in the direction of arrow C. The disposition density of embossed portions of the first embossed portion group 85b1 is lower than that of the second embossed portion group 85b2.

Figure 10:
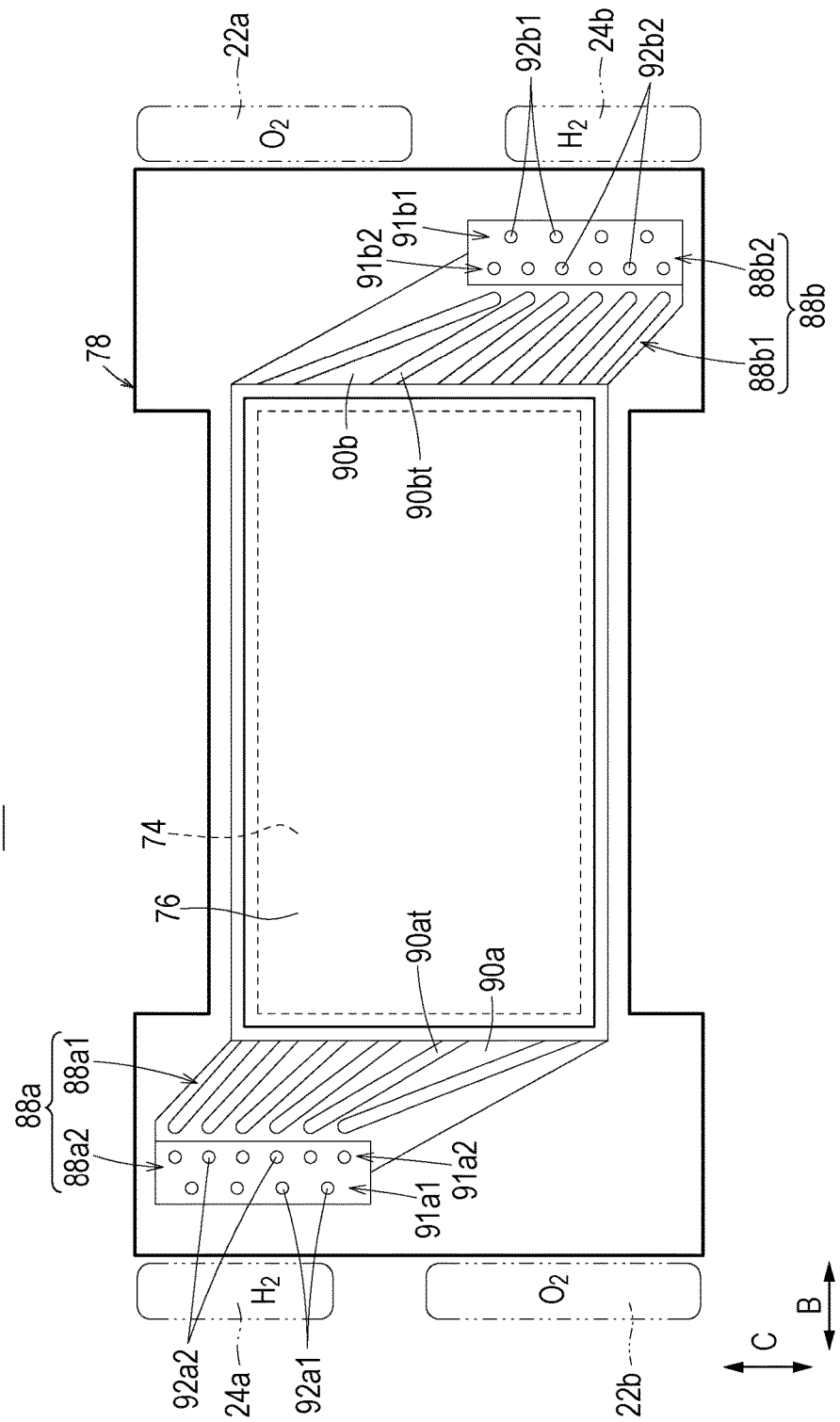
FIG. 10 illustrates the other surface of the first membrane electrode assembly of the power generation unit.

As illustrated in FIG. 10, on a surface of the first resin frame member 78 on the anode electrode 76 side, an inlet buffer portion 88a is disposed between the fuel gas inlet manifold 24a and the first fuel gas channel 38. An outlet buffer portion 88b is disposed between the fuel gas outlet manifold 24b and the first fuel gas channel 38.

Figure 3:
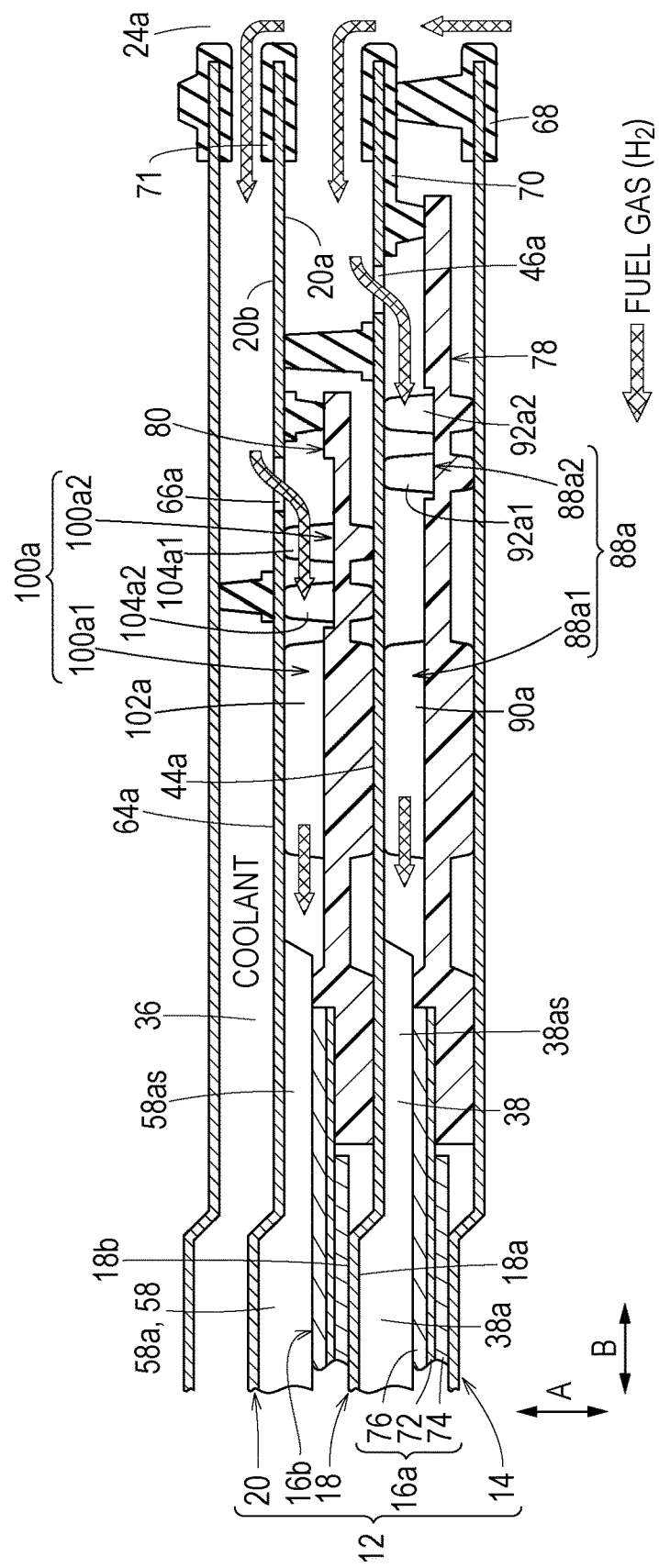
FIG. 3 is a sectional view of the power generation unit taken along line III-III in FIG. 1.

As illustrated in FIG. 3, the inlet buffer portion 88a includes a first buffer region 88a1, which is located near the first fuel gas channel 38, and a second buffer region 88a2, which is located near the fuel gas inlet manifold 24a and is deeper than the first buffer region 88a1 in the stacking direction. As illustrated in FIG. 10, the first buffer region 88a1, which is a shallow buffer, includes a plurality of linear inlet guide channels 90a. The linear inlet guide channels 90a are formed between linear protrusions 90at.

The second buffer region 88a2, which is a deep buffer, includes a first embossed portion group 91a1 and a second embossed portion group 91a2 between the fuel gas inlet manifold 24a and the first buffer region 88a1. The first and second embossed portion groups 91a1 and 91a2 extend in a plurality of rows, such as two rows, in the direction of arrow B. The first embossed portion group 91a1 includes a plurality of embossed portions 92a1 arranged in the direction of arrow C. The second embossed portion group 91a2 includes a plurality of embossed portions 92a2 arranged in the direction of arrow C. The disposition density of embossed portions of the first embossed portion group 91a1 is lower than that of the second embossed portion group 91a2.

Figure 4:
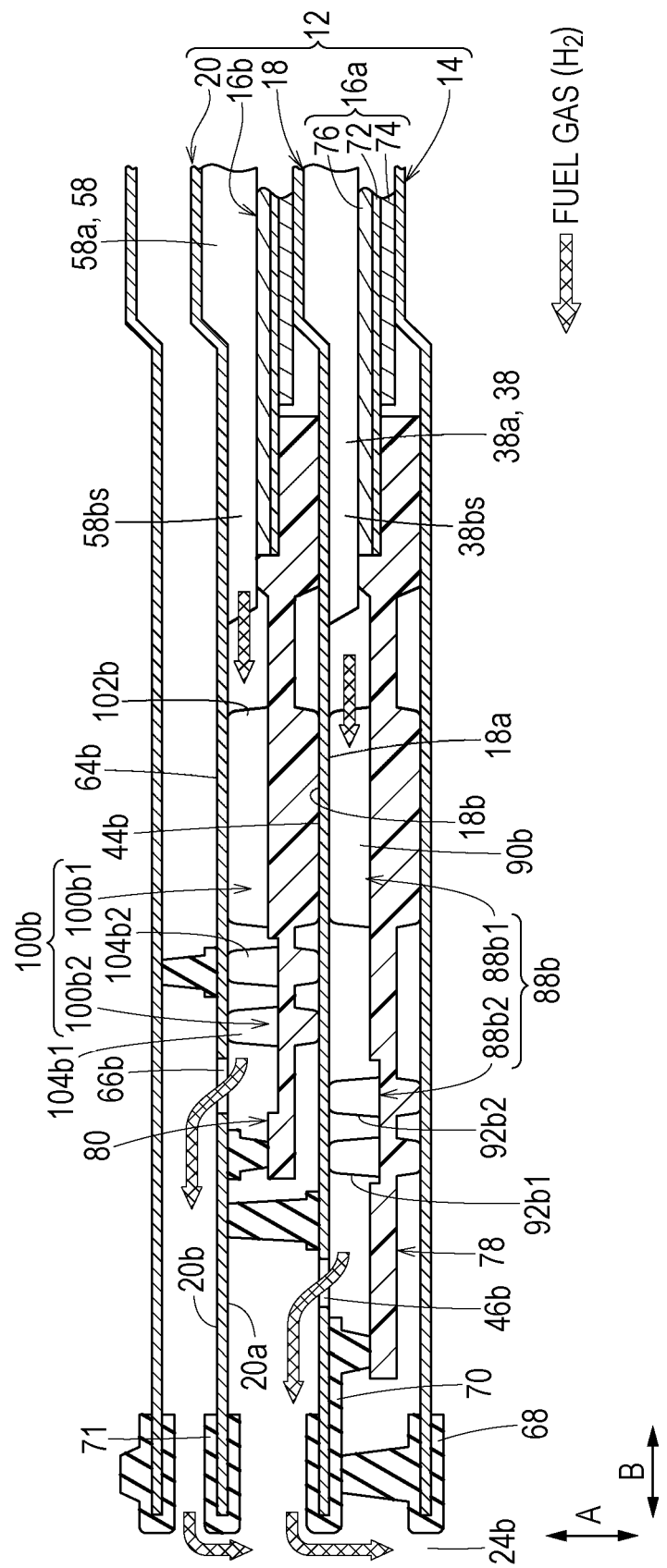
FIG. 4 is a sectional view of the power generation unit taken along line IV-IV in FIG. 1.

As illustrated in FIG. 4, the outlet buffer portion 88b includes a first buffer region 88b1, which is located near the first fuel gas channel 38, and a second buffer region 88b2, which is located near the fuel gas outlet manifold 24b and is deeper than the first buffer region 88b1 in the stacking direction. As illustrated in FIG. 10, the first buffer region 88b1, which is a shallow buffer, includes a plurality of linear outlet guide channels 90b. The linear outlet guide channels 90b are formed between linear protrusions 90bt.

The second buffer region 88b2, which is a deep buffer, includes a first embossed portion group 91b1 and a second embossed portion group 91b2 between the fuel gas outlet manifold 24b and the first buffer region 88b1. The first and second embossed portion groups 91b1 and 91b2 extend in a plurality of rows, such as two rows, in the direction of arrow B. The first embossed portion group 91b1 includes a plurality of embossed portions 92b1 arranged in the direction of arrow C. The second embossed portion group 91b2 includes a plurality of embossed portions 92b2 arranged in the direction of arrow C. The disposition density of embossed portions of the first embossed portion group 91b1 is lower than that of the second embossed portion group 91b2.

Figure 11:
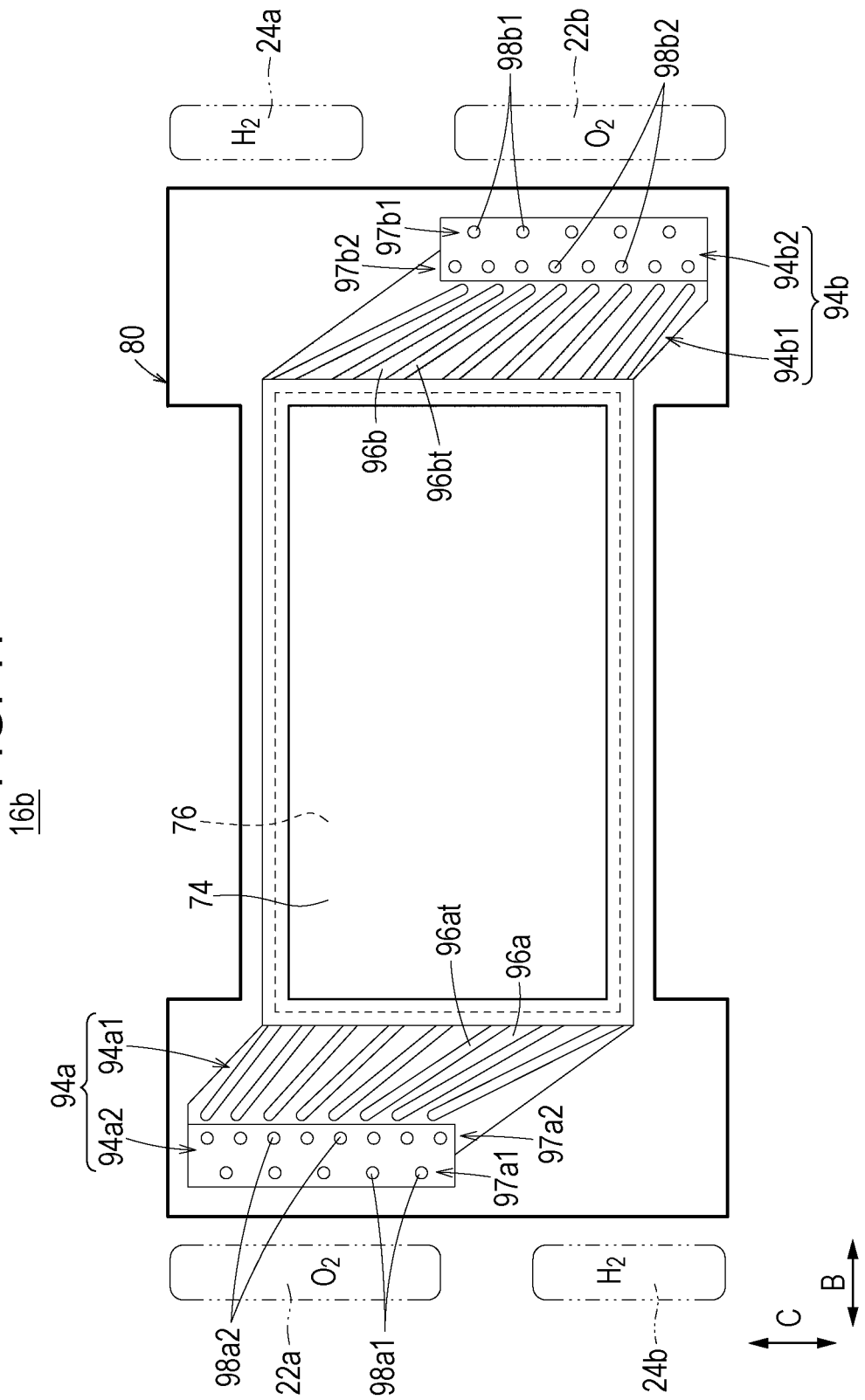
FIG. 11 illustrates one surface of a second membrane electrode assembly of the power generation unit.

As illustrated in FIGS. 1 and 11, on a surface of the second resin frame member 80 on the cathode electrode 74 side, an inlet buffer portion 94a is disposed between the oxidant gas inlet manifold 22a and the second oxidant gas channel 48. An outlet buffer portion 94b is disposed between the oxidant gas outlet manifold 22b and the second oxidant gas channel 48.

As illustrated in FIG. 5, the inlet buffer portion 94a includes a first buffer region 94a1, which is located near the second oxidant gas channel 48, and a second buffer region 94a2, which is located near the oxidant gas inlet manifold 22a and is deeper than the first buffer region 94a1 in the stacking direction. As illustrated in FIG. 11, the first buffer region 94a1, which is a shallow buffer, includes a plurality of linear inlet guide channels 96a. The linear inlet guide channels 96a are formed between linear protrusions 96at.

The second buffer region 94a2, which is a deep buffer, includes a first embossed portion group 97a1 and a second embossed portion group 97a2 between the oxidant gas inlet manifold 22a and the first buffer region 94a1. The first and second embossed portion groups 97a1 and 97a2 extend in a plurality of rows, such as two rows, in the direction of arrow B. The first embossed portion group 97a1 includes a plurality of embossed portions 98a1 arranged in the direction of arrow C. The second embossed portion group 97a2 includes a plurality of embossed portions 98a2 arranged in the direction of arrow C. The disposition density of embossed portions of the first embossed portion group 97a1 is lower than that of the second embossed portion group 97a2.

As illustrated in FIG. 6, the outlet buffer portion 94b includes a first buffer region 94b1, which is located near the second oxidant gas channel 48, and a second buffer region 94b2, which is located near the oxidant gas outlet manifold 22b and is deeper than the first buffer region 94b1 in the stacking direction. As illustrated in FIG. 11, the first buffer region 94b1, which is a shallow buffer, includes a plurality of linear outlet guide channels 96b. The linear outlet guide channels 96b are formed between linear protrusions 96bt.

The second buffer region 94b2, which is a deep buffer, includes a first embossed portion group 97b1 and a second embossed portion group 97b2 between the oxidant gas outlet manifold 22b and the first buffer region 94b1. The first and second embossed portion groups 97b1 and 97b2 extend in a plurality of rows, such as two rows, in the direction of arrow B. The first embossed portion group 97b1 includes a plurality of embossed portions 98b1 arranged in the direction of arrow C. The second embossed portion group 97b2 includes a plurality of embossed portions 98b2 arranged in the direction of arrow C. The disposition density of embossed portions of the first embossed portion group 97b1 is lower than that of the second embossed portion group 97b2.

As illustrated in FIG. 12, on a surface of the second resin frame member 80 on the anode electrode 76 side, an inlet buffer portion 100a is disposed between the fuel gas inlet manifold 24a and the second fuel gas channel 58. An outlet buffer portion 100b is disposed between the fuel gas outlet manifold 24b and the second fuel gas channel 58.

As illustrated in FIG. 3, the inlet buffer portion 100a includes a first buffer region 100a1, which is located near the second fuel gas channel 58, and a second buffer region 100a2, which is located near the fuel gas inlet manifold 24a and is deeper than the first buffer region 100a1 in the stacking direction. As illustrated in FIG. 12, the first buffer region 100a1, which is a shallow buffer, includes a plurality of linear inlet guide channels 102a. The linear inlet guide channels 102a are formed between linear protrusions 102at.

The second buffer region 100a2, which is a deep buffer, includes a first embossed portion group 103a1 and a second embossed portion group 103a2 between the fuel gas inlet manifold 24a and the first buffer region 100a1. The first and second embossed portion groups 103a1 and 103a2 extend in a plurality of rows, such as two rows, in the direction of arrow B. The first embossed portion group 103a1 includes a plurality of embossed portions 104a1 arranged in the direction of arrow C. The second embossed portion group 103a2 includes a plurality of embossed portions 104a2 arranged in the direction of arrow C. The disposition density of embossed portions of the first embossed portion group 103a1 is lower than that of the second embossed portion group 103a2.

As illustrated in FIG. 4, the outlet buffer portion 100b includes a first buffer region 100b1, which is located near the second fuel gas channel 58, and a second buffer region 100b2, which is located near the fuel gas outlet manifold 24b and is deeper than the first buffer region 100b1 in the stacking direction. As illustrated in FIG. 12, the first buffer region 100b1, which is a shallow buffer, includes a plurality of linear outlet guide channels 102b. The linear outlet guide channels 102b are formed between linear protrusions 102bt.

The second buffer region 100b2, which is a deep buffer, includes a first embossed portion group 103b1 and a second embossed portion group 103b2 between the fuel gas outlet manifold 24b and the first buffer region 100b1. The first and second embossed portion groups 103b1 and 103b2 extend in a plurality of rows, such as two rows, in the direction of arrow B. The first embossed portion group 103b1 includes a plurality of embossed portions 104b1 arranged in the direction of arrow C. The second embossed portion group 103b2 includes a plurality of embossed portions 104b2 arranged in the direction of arrow C. The disposition density of embossed portions of the first embossed portion group 103b1 is lower than that of the second embossed portion group 103b2.

When two power generation units 12 are stacked, the coolant channel 36 is formed between the first separator 14 of one of the power generation units 12 and the third separator 20 of the other power generation unit 12.

The operation of the fuel cell 10 will be described below.

First, as illustrated in FIG. 1, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or oil, is supplied to the pair of coolant inlet manifolds 25a.

As illustrated in FIG. 5, a part of the oxidant gas flows from the oxidant gas inlet manifold 22a through the inlet buffer portion 82a, and is introduced into the first oxidant gas channel 26 of the first separator 14. The remaining part of the oxidant gas flows from the oxidant gas inlet manifold 22a through the inlet buffer portion 94a to the second oxidant gas channel 48 of the second separator 18.

As illustrated in FIG. 1, the part of the oxidant gas flows along the first oxidant gas channel 26 in the direction of arrow B (horizontal direction), and is supplied to the cathode electrode 74 of the first membrane electrode assembly 16a. The remaining part of the oxidant gas flows along the second oxidant gas channel 48 in the direction of arrow B and is supplied to the cathode electrode 74 of the second membrane electrode assembly 16b.

As illustrated in FIG. 3, a part of the fuel gas flows from the fuel gas inlet manifold 24a through the supply holes 46a of the second separator 18 and is introduced into the inlet buffer portion 88a. The part of the fuel gas flows through the inlet buffer portion 88a and is supplied to the first fuel gas channel 38 of the second separator 18.

The remaining part of the fuel gas flows from the fuel gas inlet manifold 24a through the supply holes 66a of the third separator 20 and is supplied to the inlet buffer portion 100a. The remaining part of the fuel gas flows through the inlet buffer portion 100a to the second fuel gas channel 58 of the third separator 20.

As illustrated in FIG. 1, the part of the fuel gas flows along the first fuel gas channel 38 in the direction of arrow B and is supplied to the anode electrode 76 of the first membrane electrode assembly 16a. The remaining part of the fuel gas flows along the second fuel gas channel 58 in the direction of arrow B and is supplied to the anode electrode 76 of the second membrane electrode assembly 16b.

Accordingly, in each of the first membrane electrode assembly 16a and the second membrane electrode assembly 16b, the oxidant gas supplied to the cathode electrode 74 and the fuel gas supplied to the anode electrode 76 are consumed in electrochemical reactions in the electrode catalyst layers, and therefore electric power is generated.

Next, as illustrated in FIG. 6, the oxidant gas, which has been supplied to the cathode electrodes 74 of the first membrane electrode assembly 16a and the second membrane electrode assembly 16b and consumed, passes through the outlet buffer portions 82b and 94b and is discharged to the oxidant gas outlet manifold 22b.

As illustrated in FIG. 4, the fuel gas, which has been supplied to the anode electrodes 76 of the first membrane electrode assembly 16a and the second membrane electrode assembly 16b and consumed, is introduced into the outlet buffer portions 88b and 100b. The fuel gas flows through the discharge holes 46b and 66b and is discharged to the fuel gas outlet manifold 24b.

As illustrated in FIG. 1, the coolant, which has been supplied to the pair of coolant inlet manifolds 25a, is introduced into the coolant channel 36. The coolant temporarily flows inward in the direction of arrow C, then flows in the direction of arrow B, and cools the first membrane electrode assembly 16a and the second membrane electrode assembly 16b. Then, the coolant flows outward in the direction of arrow C and is discharged to the pair of coolant outlet manifolds 25b.

As illustrated in FIG. 9, in the present embodiment, for example, the inlet buffer portion 82a is disposed on a surface of the first resin frame member 78 on the cathode electrode 74 side. As illustrated in FIG. 5, the inlet buffer portion 82a includes the first buffer region 82a1, which is located near the first oxidant gas channel 26, and the second buffer region 82a2, which is located near the oxidant gas inlet manifold 22a and is deeper than the first buffer region 82a1 in the stacking direction. In the second buffer region 82a2, which is a deep buffer, the first embossed portion group 85a1, which includes the plurality of embossed portions 86a1, and the second embossed portion group 85a2, which includes the plurality of embossed portions 86a2, are arranged in two rows. The disposition density of embossed portions of the first embossed portion group 85a1, which is near the oxidant gas inlet manifold 22a, is lower than that of the second embossed portion group 85a2, which is near the first buffer region 82a1.

In the first buffer region 82a1, a clearance (not shown) is formed between an end of the protrusion 84at and the surface 14a of the first separator 14. Therefore, in a member on which the inlet buffer portion 82a is formed, that is, in the first resin frame member 78, it is possible to reduce a stress acting on an end portion of the second buffer region 82a2, which is a deep buffer near the oxidant gas inlet manifold 22a. This is because, when the first separator 14 contacts the end of the protrusion 84at and becomes deformed, concentration of stress on the embossed portions 86a1 and 86a2 can be suppressed. Accordingly, an advantage can be obtained in that the durability of the first resin frame member 78 is appropriately improved.

Moreover, the outlet buffer portion 82b is disposed on a surface of the first resin frame member 78 on the cathode electrode 74 side. The outlet buffer portion 82b, which has the same structure as the inlet buffer portion 82a, provides the same advantage in that the durability of the first resin frame member 78 can be improved.

On a surface of the first resin frame member 78 on the anode electrode 76 side, the inlet buffer portion 88a is disposed between the fuel gas inlet manifold 24a and the first fuel gas channel 38. The outlet buffer portion 88b is disposed between the fuel gas outlet manifold 24b and the first fuel gas channel 38. This provides the same advantage as the inlet buffer portion 82a does.

Furthermore, the second resin frame member 80 includes the inlet buffer portions 94a and 100a and the outlet buffer portions 94b and 100b. The inlet buffer portions 94a and 100a and the outlet buffer portions 94b and 100b, which have the same structures as the inlet buffer portion 82a described above, each provide the same advantage.

In the present embodiment, each of the fuel cells 10 of the power generation unit 12 is a so-called stepped cooling fuel cell, which includes three separators and two MEAs. However, this is not a limitation. For example, the fuel cell may be an independent cooling fuel cell, in which one MEA is sandwiched between two separators.

In the present embodiment, the inlet buffer portions 82a and 88a and the outlet buffer portions 82b and 88b are formed on the first resin frame member 78, and the inlet buffer portions 94a and 100a and the outlet buffer portions 94b and 100b are formed on the second resin frame member 80. Alternatively, the inlet buffer portion 82a and the outlet buffer portion 82b may be formed on the first separator 14. In this case, the inlet buffer portions 88a and 94a and the outlet buffer portions 88b and 94b may be formed on the second separator 18, and the inlet buffer portion 100a and the outlet buffer portion 100b may be formed on the third separator 20.

According to an aspect of the present disclosure, a fuel cell includes a membrane electrode assembly and a separator that are stacked, the membrane electrode assembly including an electrolyte membrane and a pair of electrodes sandwiching the electrolyte membrane therebetween; a reactant gas channel through which a reactant gas is supplied along an electrode surface of the membrane electrode assembly; and a reactant gas manifold through which the reactant gas flows in a stacking direction in which the separator is stacked.

The fuel cell includes a buffer portion that connects the reactant gas manifold to the reactant gas channel. The buffer portion includes a first buffer region and a second buffer region, the first buffer region being located near the reactant gas channel and including a plurality of guide channels, the second buffer region being located near the reactant gas manifold and being deeper than the first buffer region in the stacking direction. Embossed portion groups are arranged in a plurality of rows in the second buffer region between the reactant gas manifold and the first buffer region, each of the embossed portion groups including a plurality of embossed portions. A disposition density of the embossed portions of one of the embossed portion groups near the reactant gas manifold is lower than a disposition density of the embossed portions of another of the embossed portion groups near the first buffer region.

In the fuel cell, it is preferable that a resin frame member be disposed on an outer periphery of the membrane electrode assembly, and the first buffer region and the second buffer region be formed on the resin frame member.

According to the present disclosure, embossed portion groups, each including a plurality of embossed portions, are arranged in a plurality of rows in the second buffer region, which is located near the reactant gas manifold and is deeper than the first buffer region. The disposition density of the embossed portions of one of the embossed portion groups near the reactant gas manifold is lower than the disposition density of the embossed portions of another of the embossed portion groups near the first buffer region. Therefore, in a member on which the buffer portion is formed, it is possible to reduce a stress acting on an end portion of the second buffer region, which is a deep buffer, near the reactant gas manifold. Accordingly, the durability of the member is appropriately increased.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly and a separator that are stacked, the membrane electrode assembly including an electrolyte membrane and a pair of electrodes sandwiching the electrolyte membrane therebetween;
   a reactant gas channel through which a reactant gas is supplied along an electrode surface of the membrane electrode assembly;
   a reactant gas manifold through which the reactant gas flows in a stacking direction in which the separator is stacked; and
   a buffer portion that connects the reactant gas manifold to the reactant gas channel,
   wherein the buffer portion includes a first buffer region and a second buffer region, the first buffer region being located near the reactant gas channel and including a plurality of guide channels, the second buffer region being located near the reactant gas manifold and being deeper than the first buffer region in the stacking direction,
   wherein embossed portion groups are arranged in a plurality of rows in the second buffer region between the reactant gas manifold and the first buffer region, each of the embossed portion groups including a plurality of embossed portions, and
   wherein a disposition density of all of the embossed portions in a first row of a first embossed portion group of the embossed portion groups near the reactant gas manifold is lower than a disposition density of all of the embossed portions in a second row of a second embossed portion group of the embossed portion groups near the first buffer region, the first embossed portion group being closest to the reactant gas manifold of all of the embossed portion groups.

2. The fuel cell according to claim 1,
   wherein a resin frame member is disposed on an outer periphery of the membrane electrode assembly, and the first buffer region and the second buffer region are formed on the resin frame member.

3. A fuel cell comprising:
a membrane electrode assembly and a separator that are stacked in a stacking direction, the membrane electrode assembly comprising:
an electrolyte membrane;
a first electrode; and
a second electrode, the first and the second electrodes sandwiching the electrolyte membrane between the first and the second electrodes in the stacking direction;
a reactant gas channel through which a reactant gas is supplied along an electrode surface of the membrane electrode assembly;
a reactant gas manifold through which the reactant gas flows in the stacking direction; and
a buffer portion connecting the reactant gas manifold to the reactant gas channel, the buffer portion comprising:
a first buffer region located in a vicinity of the reactant gas channel and including a plurality of guide channels; and
a second buffer region located in a vicinity of the reactant gas manifold and being deeper than the first buffer region in the stacking direction, embossed portion groups being arranged in a plurality of rows in the second buffer region between the reactant gas manifold and the first buffer region, each of the embossed portion groups including a plurality of embossed portions, a disposition density of all of the embossed portions in a first row of a first embossed portion group of the embossed portion groups in a vicinity of the reactant gas manifold being lower than a disposition density of all of the embossed portions in a second row of a second embossed portion group of the embossed portion groups in a vicinity of the first buffer region, the first embossed portion group being closest to the reactant gas manifold of all of the embossed portion groups.

4. The fuel cell according to claim 3,
wherein a resin frame member is disposed on an outer periphery of the membrane electrode assembly, and the first buffer region and the second buffer region are provided on the resin frame member.

5. The fuel cell according to claim 3,
wherein linear protrusions are provided in the first buffer region, and
wherein the plurality of guide channels are provided between the linear protrusions.

6. The fuel cell according to claim 3,
wherein the embossed portion groups are arranged in the plurality of rows in a flow direction of the reactant gas, and
wherein the plurality of embossed portions are arranged in a vertical direction.

7. A fuel cell comprising:
a membrane electrode assembly and a separator that are stacked, the membrane electrode assembly including an electrolyte membrane and a pair of electrodes sandwiching the electrolyte membrane therebetween;
a reactant gas channel through which a reactant gas is supplied along an electrode surface of the membrane electrode assembly;
a reactant gas manifold through which the reactant gas flows in a stacking direction in which the separator is stacked; and
a buffer portion that connects the reactant gas manifold to the reactant gas channel,
wherein the buffer portion includes a first buffer region and a second buffer region, the first buffer region being located near the reactant gas channel and including a plurality of guide channels, the second buffer region being located near the reactant gas manifold and being deeper than the first buffer region in the stacking direction,
wherein embossed portion groups are arranged in a plurality of rows in the second buffer region between the reactant gas manifold and the first buffer region, each of the embossed portion groups including a plurality of embossed portions,
wherein a disposition density of the embossed portions of a first embossed portion group of the embossed portion groups near the reactant gas manifold is lower than a disposition density of the embossed portions of a second embossed portion group of the embossed portion groups near the first buffer region, the first embossed portion group being closest to the reactant gas manifold of all of the embossed portion groups,
wherein first embossed portions in the first embossed portion group are arranged in a first row,
wherein second embossed portions in the second embossed portion group are arranged in a second row, and
wherein the first embossed portions in the first row are spaced farther apart from one another than the second embossed portions in the second row.

8. A fuel cell comprising:
a membrane electrode assembly and a separator that are stacked in a stacking direction, the membrane electrode assembly comprising:
an electrolyte membrane;
a first electrode; and
a second electrode, the first and the second electrodes sandwiching the electrolyte membrane between the first and the second electrodes in the stacking direction;
a reactant gas channel through which a reactant gas is supplied along an electrode surface of the membrane electrode assembly;
a reactant gas manifold through which the reactant gas flows in the stacking direction; and
a buffer portion connecting the reactant gas manifold to the reactant gas channel, the buffer portion comprising:
a first buffer region located in a vicinity of the reactant gas channel and including a plurality of guide channels; and
a second buffer region located in a vicinity of the reactant gas manifold and being deeper than the first buffer region in the stacking direction, embossed portion groups being arranged in a plurality of rows in the second buffer region between the reactant gas manifold and the first buffer region, each of the embossed portion groups including a plurality of embossed portions, a disposition density of the plurality of embossed portions of a first embossed portion group of the embossed portion groups in a vicinity of the reactant gas manifold being lower than a disposition density of the plurality of embossed portions of a second embossed portion group of the embossed portion groups in a vicinity of the first buffer region, the first embossed portion group being closest to the reactant gas manifold of all of the embossed portion groups,
wherein first embossed portions in the first embossed portion group are arranged in a first row, wherein second embossed portions in the second embossed portion group are arranged in a second row, and wherein the first embossed portions in the first row are spaced farther apart from one another than the second embossed portions in the second row.

* * * * *